United States Patent Office 3,317,433
Patented May 2, 1967

3,317,433
HEAT RUPTURABLE CAPSULES
Herman J. Eichel, Dayton, Ohio, assignor to The National Cash Register Company, Dayton, Ohio, a corporation of Maryland
No Drawing. Filed Jan. 27, 1960, Ser. No. 4,858
8 Claims. (Cl. 252—316)

This in a continuation-in-part of my co-pending application for U.S. Letters Patent, Ser. No. 769,058, filed Oct. 23, 1958, now abandoned.

This invention relates to heat-rupturable capsules of minute size, and to a method for the collective and simultaneous manufacture of a multiplicity of such capsules, such capsules each having a protective rupturable solid wall surrounding and confining a core material entity. The core material entities are released for use by rupture of the protective walls by the application of heat. The heat causes the production of gas from materials incorporated in the capsule walls, in the core material entities, or in both, resulting in the rupture of the capsule walls, either by internally-produced pressures against said walls by the gas produced by the gas-producing substance, or substances, contained in the core material entities, or by disintegration of the wall material by gasification of materials contained in the walls themselves, or both.

By the term "minute" is meant capsules of such size that they may be visible individually to the unaided eye, or microscopic in size, but which, because of their small size, cannot be handled easily individually, by manual or mechanical means. Because of the small dimensions of the capsules to be produced, the preferred method of manufacturing them involves the dispersion of the core material entities in a liquid which contains the wall materials, which wall materials are deposited around the core materials are nuclei.

Apart from the gas-producing materials which are incorporated into the capsules' walls or in their contents, such capsules consist of liquid-soluble film-forming wall material, such as natural hydrophilic colloid materials, or polymeric film-forming materials derived by polymerization of monomer materials; or consist of mixtures or layers of such materials which exist, or may be made to exist, as solids at temperatures encountered before rupture of the capsules by application of heat.

Core materials and gas-producing substances, which may be used as the core entities of the capsules, may be liquids, liquid solutions, dispersions of solids in liquids, solids dispersed in liquid solutions of solids, solid solutions, or particulate solids having the characteristic of being water-insoluble or substantially so. The core materials with which the invention is mostly concerned, and which are protected by the capsule walls, are those which, by contact with substances external to the capsule walls, may deteriorate, react, mark, escape, adhere to external objects, poison vegetable or animal life, or be difficult to handle, as are solid or liquid chemically-active or tacky materials.

Typical wall-forming materials are gelatin, complexes of gelatin with vegetable hydrophilic colloids such as gum arabic, protein film-forming materials, especially zein, and other synthetic film-moving substances such as polymers of styrene or divinyl benzene, polyethylenemaleic anhydride copolymer, or the vinyl analog thereof.

Typical liquid core materials, useful in or as core entities, are evaporable solvents or fuels (such as toluene, kerosene, other light petroleum fractions, and xylene). Typical other liquid materials which may be used for core entities and which, although not evaporable, are reactive or perishable upon contact with external substances, such as the atmosphere, or which must be protected from bacteria and other degenerating organisms, are vitamin A oil (such as fish oils), perfume oils (such as fruit skin oils), vegetable oils (such as olive oil, linseed oil, and peanut oil), and oils of synthetic origin which are dissipated in air (such as methyl salicylate). Typical flowable semi-solid substances, which may be used as core materials, are adhesives which are naturally tacky or made so by solvents or plasticizers, various greases and hard oils, and medicinal preparations dispersed or dissolved in oily or tacky vehicles, giving such preparations flowing but non-liquid properties. Typical solid core materials which may be dissolved in a liquid carrier are dyes (such as Sudan III; crystal violet lactone; and benzoyl-leucomethylene blue). Typical of substantially insoluble particulate materials which may be used as core entity materials, either by themselves or in liquid suspension, are carbon black, magnetic iron oxide, aspirin, and others too numerous to mention.

It is within the scope of this invention to provide a mixture of a variety of sizes of capsules and a mixture of varieties of capsule contents, by the process of bringing different kinds of capsules together after they have been separately manufactured, or having the core material entities of different kinds dispersed in the same fluid and encapsulated therein the same procedural step. It is also within the scope of this invention to provide capsules which are ruptured by gases produced within the core entities or gases produced in the capsular walls, or in both, at different temperature levels, so that, in a group of such capsules, some may explode and release their core material contents at one temperature, and others at another temperature.

It is within the scope of the invention to provide such heat-rupturable capsules for use as components in an external embedding substance which will react or combine with the core entity materials, when such materials are released by heat rupture, such as capsules containing solvents or plasticizers embedded in a solid adhesive film.

The heat-rupturable capsules may contain liquid, or heat-liquefiable, marking materials, which, by their change in color or their chemical reactant properties, are useful, when released upon capsule rupture, to make marks on record material on which such capsules previously may have been deposited or coated, or on record material placed in contact with ruptured capsules. For instance, such print-making capsules may be coated on a sheet which is subjected in selected areas to heat, to form characters, which characters remain in situ or are transferred by pressures to a transfer-receiving copy sheet. Different kinds of capsules interspersed in the same embedded material may have core contents which react when brought into contact, by heat-rupture of the capsule, to form a new and useful material or result.

In another application, such capsules may contain solvents which are released to activate potentially activatable adhesive materials to an active state. As a particular example, such capsules containing solvents may be embedded in a coating on a web, which coating normally is non-adhesive but may be rendered adhesive by application of heat which ruptures the capsules, the solvent material released from the capsules activating said adhesive. Thus, a sealing tape having such capsule-bearing adhesive coating may be rendered active, and at the same time applied to a receiving surface, by a hot iron.

In another use of the capsules, the core material may be a fire-extinguishing substance which is automatically released by gas pressure developed within the capsule, or developed in its walls, by the heat of the fire to be extinguished. The fire-extinguishing substances so encapsulated may be, of themselves, heat-gasifying or containing heat-gasifiable material.

It is within the scope of this invention to provide heat-rupturable capsules which contain, in dissolved liquid form, a chemical compound which changes in color when subjected to electromagnetic radiation of determined wave lengths. Such capsules may be coated on a supporting web and differentially subjected in areas to the proper exciting wave lengths to form colored characters or data, which coated web may be "fixed" by rupture of the capsules, which dries the then-exposed fluid, so that the compound material therein will become solid and thus be no longer changeable by applied radiation either in the character-bearing areas or in the non-character-bearing areas thereof. The formation of such characters in a coating of pressure-rupturable capsules is disclosed in U.S. Patent No. 3,072,481 which issued Jan. 8, 1963, on an application for United States Letters Patent, Ser. No. 684,592, filed by Elliot Berman and Helmut Schwab on Sept. 17, 1957, but in the invention of this application, heat and not external pressure is used to rupture the capsules, as specified in said Berman et al. application.

In the examples to follow will be given a number of capsule-making techniques, with examples of typical useful materials to be encapsulated, but the invention is not to be deemed limited thereto, as the broad nature of the invention permits the capsules to be made by other procedures and to be made of and contain other materials than those which have been or will be specifically mentioned.

Three typical gas-producing agents, which otherwise have no particular use in the core entity material or the capsular wall material and which are finely divided particulate solids and which decompose by heat, will be designated (I), which is p,p'-oxybis-(benzenesulfonyl hydrazide), sold commercially, at present, by Naugatuck Chemical Division of United States Rubber Company, of Naugatuck, Conn., under the trade name "Celogen," and which is a white powder the molecules of which individually decompose at temperatures from 266 degrees Fahrenheit upward; (II), azodicarbonamide, sold by the same company under the trade name "Celogen-Az," which decomposes at temperatures of from 266 degrees to 380 degrees Fahrenheit and upward, depending on the environment (266 degrees in water-diluted diethylene-glycol and 380 degrees in air); and (III), di-nitrosopentamethylene tetramine, which now is sold commercially by Imperial Chemical Industries, Limited, under the trade designation "BMC," which decomposes at between 230 degrees and 257 degrees Fahrenheit. Any of these gas-producing materials may be incorporated in the core materials or the capsule wall materials.

Among the core materials that are liquid at room temperature and at temperatures at which the capsules are made are the halogenated ethanes and methanes containing at least one fluorine substituent. Among these are

|  | Boiling point, ° C. |
|---|---|
| $CBrF_2$—$CBrF_2$ | 47.5 |
| $CCl_2F$—$CClF_2$ | 47.6 |
| $CCl_2F$—$CCl_2F$ | 92.8 | and these materials singly or combined may be used as core-forming droplets in the aqueous manufacturing vehicles to be described in the same manner as the other core materials which are water-immiscible liquids. These core materials when contained in the finished capsules act to produce gas by decomposition when heated to above the boiling temperature, such gases exploding the capsules. These decomposing liquids produce over one hundred times the volume of gas as compared to their volume in the liquid state. The capsules may be used in thermoplastic or thermosetting moldable materials, the molding temperatures exploding the capsules and the escaping gas producing voids in the molded product. In polymer material molding, for example, gas expanded heat insulation of low heat-conductivity is produced because the gases of the named compounds have low heat-conductivity. Moreover such gases are fire-retardants and may be used where desired, to explode and retard fire when such occurs.

As a first, and preferred, example, the making of oil-containing capsules having walls of solid film-forming hydrophilic colloid material, with a gas-producing substance suspended in the oil, will be disclosed, as it is a simple and typical example of the method of making such capsules and the capsules made thereby. Three parts, by weight, of gas-producing compound (I) is dispersed in 17 parts, by weight, of chlorinated diphenyl having a specific gravity of between 1.378 and 1.388 to form an internal phase which is emulsified in 29 parts, by weight, of a 3.5 percent aqueous solution of pigskin gelatin having its iso-electric point at pH 8. The emulsion, when reduced to the desired drop-size, has its pH adjusted, if necessary, to 9, or above, with a 5% aqueous solution of sodium hydroxide. To this emulsion is added 9 parts, by weight, of an 11% aqueous sol of gum arabic, which sol had previously been adjusted to pH 9, or above, with the equivalent sodium hydroxide solution. The emulsion mixture is diluted with water to a total value of 375 milliliters, and coacervation of the gelatin and gum arabic molecules is induced by lowering the pH, with a 15% aqueous solution of acetic acid, to 4.6. All the foregoing steps are performed at a temperature of about 50 degrees centigrade with constant agitation. The capsules are now formed, but the capsule walls are in a liquid condition, ready to be solidified or made rigid, which is accomplished, as the next step, by reducing the temperature of the agitated dispersion medium and capsules to about 50 degrees Fahrenheit. To the resulting dispersion of capsules with solid walls is added 0.5 part, by weight, of a 25% aqueous solution of glutaraldehyde to harden the capsules, which hardening will be completed in a few hours. The residual aqueous medium of the dispersion may be reduced or eliminated by any convenient means, such as evaporation, decantation, filtering, centrifuging, or spray-drying in a gas, to the condition in which it is desired to use the capsules. If the water is entirely eliminated and the hardened capsules are kept agitated during the water removal, they act like fine dry powder and may be applied to or incorporated in any desired medium.

In a second example, a different method of making the capsules will be specified, and the gas-producing substance will be present in the capsule walls and not in the capsular core material. The capsules so produced by this second example can be made with strong walls that will contain large liquid droplets, large enough to be seen by the unaided eye, without collapse due to structural frailty. In the second method, 25 parts, by weight, of chlorinated diphenyl having a specific gravity of 1.378–1.388 is dispersed in 660 parts, by weight, of a 1%, by weight, aqueous solution of pigskin gelatin having its iso-electric point at pH 8, and the dispersion is then raised, if necessary, to pH 9. The size of the dispersion drops of core material solution can be controlled by dropping such solution, drop by drop, from a stop-cock-controlled burette having its end in close proximity to the blades of a stirrer. The velocity of the blades may be adjusted in conjunction with adjustment of the stop-cock to obtain the desired drop size, the average diameter of which may be as large as 500 microns, which is one-half millimeter or as little as several microns in diameter. To this dispersion is added 50 parts, by weight, of a 2%, by weight, aqueous solution of polyethylenemaleic anhydride copolymer having a molecular weight of about 1,000–2,000, as determined by testing a 1%, by weight, solution of it in dimethyl formamide at 25 degrees centigrade, by the Ostwald (Method B) viscosity test procedure, the solution having previously been adjusted to pH 9 by the addition of a 20%, by weight, aqueous solution of sodium hydroxide. The pH of the agitated emulsion is lowered to 4.8 by addition of a 15% aqueous solution of acetic acid. This lowering of the pH induces coacervation of the colloid molecules into a liquid phase which deposits about the dispersed droplets of chlorinated diphenyl to form a thin liquid capsular first wall, the deposition stopping at a thickness of about 5 microns. At this point, the mixture of colloid material and water is enriched with more colloid material by the addition of 25 parts, by weight, of a 2% aqueous solution of polyethylenemaleic anhydride copolymer having a molecular weight of about 60,000 to 90,000 as determined by the Ostwald viscosity method mentioned before. This enriched reaction mixture is quickly brought to pH 5.5 with the mentioned 20%, by weight, aqueous solution of sodium hydroxide. Then 3 parts, by weight, of compound (I) is dispersed in the adjusted enriched reaction mixture. The pH of the reaction mixture is then slowly brought to 4.6 by the addition of a 15%, by weight, aqueous solution of acetic acid, whereupon a second coacervation, involving the newly-introduced colloid material, is induced, which new coacervate, and the dispersed particles of compound (I) carried with the colloid by entrainment, are deposited on the first-formed walls of the capsules as a second liquid wall. The formed capsules have the walls made solid and rigid by lowering the temperature of the reaction mixture and capsular contents to 50 degrees Fahrenheit. The, now, solid-walled capsules may be hardened by the same method specified in the first example. These extra-strong-walled capsules may be recovered from the residual water in the manners suggested in Example 1.

The third example consists of a method for producing capsules having the gas-producing substance in both the core material of the capsules and the walls of the capsules, and these gas-producing substances may be of one kind in the capsular core material and of another kind in the capsule walls. Either the method of Example 1 or the method of Example 2 may be modified to obtain this result. In the event it is desired to have a gas-producing substance in the core material different from that in the wall material, Compounds (I) and (II) will be considered. Stipulating that Compound (I) has been dispersed in the chlorinated diphenyl, which is thereafter dispersed in the aqueous medium, followed by the additions of the gelatin sol and the gum arabic sol, as set forth in Example 1, and that coacervation has been induced, then, just after the coacervate has started to deposit on the chlorinated diphenyl droplets containing Compound (I), and before coacervate deposit has ceased, there is added and stirred in Compound (II); the total of Compounds (I) and (II) together should not exceed more than about 15%, by weight, of the core material to prevent possible interference with the coacervate deposition.

The fourth example consists in the making of capsules by Example 2 but having the gas-producing substance in the core material as well as in the capsular wall material. In this Example 4, the selected gas-producing compound is dispersed in an amount of about 5%, by weight, of the core material of Example 2, and the procedure of Example 2 is thereafter followed to completion.

The fifth example is like the first example except that the internal oil-phase is one of the halogenated ethane and methane materials specified, or equivalent liquids that suddenly change into a gas at temperatures substantially above room temperature.

In all the examples so far given, gellable film-forming colloid material has been used for the capsule walls, and a synthetic oil has been used as the core material. Because of the gellability of the capsule wall materials and their use as droplets as individual seed points, it is necessary that the aqueous medium and contents be kept agitated throughout the process, and that the temperature be kept above the gelling point until the cooling step is reached.

Capsules may be made by other methods than those specified in Examples 1 to 4, and such other methods may not use film-forming hydrophilic colloid material alone for the capsule walls, one such method employing polymer material, derived from a monomer material, as the capsular wall material. Such a process is disclosed in application for United States Letters Patent, Ser. No. 739,716, filed June 4, 1958, by Carl Brynko, now Patent No. 2,969,330. In a companion application for United States Letters Patent, Ser. No. 748,512, filed July 14, 1958, by Carl Brynko and Joseph A. Scarpelli, now Patent No. 2,969,331 there is disclosed a dual-walled capsule, the walls being layers of the polymer material and the hydrophilic film-forming colloid material. The gas-producing materials may be introduced into the core material in a manner the same as or similar to that described in Example 1. In the Brynko and Scarpelli capsules, the gas-producing materials may be introduced into the colloid capsule walls in the manner specified in Example 3.

As before mentioned, the core material may, if a liquid, have dispersed or dissolved therein solid material, such as dye materials, dispersed or dissolved in a liquid of non-aqueous character. A solid particulate material may be encapsulated according to the process of Example 3, where the capsular wall material has the gas-producing material therein.

The specific disclosure of simple embodiments of the invention as to core materials, capsular wall materials, gas-forming materials, and encapsulating procedures is not to be deemed to limit the scope of the invention, as obvious equivalents will readily come to mind. The invention broadly relates to the production of capsules of minute or microscopic dimensions, that can be ruptured to expose the capsule contents by the application of heat, such being caused by gas-producing substances contained in the materials constituting the capsules.

What is claimed is:

1. As an article of manufacture, a minute gas-rupturable capsule consisting essentially of
    (a) a substantiallly water-insoluble core material,
    (b) a seamless gas-pressure-rupturable solid capsule wall of hydrophilic film-forming polymeric material surrounding and normally confining said core material, and
    (c) disposed in said capsule a heat-activatable material, which itself, when heated above an elevated predetermined temperature, rapidly and abruptly evolves, in situ, an amount of gas exerting a pressure sufficient to abruptly rupture the capsule wall, thereby releasing the confined core material.

2. The capsule of claim 1 in which the heat-activatable material is a solid.

3. The capsule of claim 2 in which the heat-activatable material is selected from the group consisting of p,p'-oxybis(benzenesulfonyl hydrazide), azodicarbonamide, and di-nitrosopentamethylene tetramine.

4. The capsule of claim 2 in which the heat-activatable material is present only in the capsule wall.

5. The capsule of claim 2 in which the heat-activatable material is present only in the core material.

6. The capsule of claim 2 in which the heat-activatable material is present both in the capsule wall and in the core material.

7. The capsule of claim 1 in which the heat-activatable material is a liquid.

8. The capsule of claim 7 in which the heat-activatable material is selected from the group consisting of $$CBrF_2—CBrF_2$$

$CCl_2F—CClF_2$; and $CCl_2F—CCl_2F$.

References Cited by the Examiner

UNITED STATES PATENTS

| | | | |
|---|---|---|---|
| 1,356,544 | 10/1920 | Miller | 167—83 X |
| 1,707,762 | 4/1929 | Homan | 167—83 X |
| 2,745,808 | 5/1956 | Roe | 252—8 |
| 2,797,201 | 6/1957 | Veatch et al. | 260—2.5 |
| 2,800,457 | 7/1957 | Green et al. | 252—316 |
| 2,901,446 | 8/1959 | Hawkins | 260—2.5 |
| 2,949,424 | 8/1960 | Mandelcorn et al. | 252—1 |

LEON D. ROSDOL, *Primary Examiner.*

JULIUS GREENWALD, *Examiner.*

R. D. LOVERING, *Assistant Examiner.*